United States Patent [19]
Henmi

[11] Patent Number: 6,137,603
[45] Date of Patent: Oct. 24, 2000

[54] OPTICAL NETWORK, OPTICAL DIVISION AND INSERTION NODE AND RECOVERY SYSTEM FROM NETWORK FAILURE

[75] Inventor: Naoya Henmi, Tokyo, Japan

[73] Assignee: NEC Corporation, Tokyo, Japan

[21] Appl. No.: 08/950,437

[22] Filed: Oct. 15, 1997

[30] Foreign Application Priority Data

Oct. 15, 1996 [JP] Japan ................................. 8-271227

[51] Int. Cl.[7] .................................................. H04B 10/08
[52] U.S. Cl. ........................ 359/110; 359/119; 359/127
[58] Field of Search ................................ 359/110, 119, 359/127, 124–125

[56] References Cited

U.S. PATENT DOCUMENTS

| | | | |
|---|---|---|---|
| 5,717,796 | 2/1998 | Clendening | 359/119 |
| 5,760,934 | 6/1998 | Sutter et al. | 359/119 |
| 5,867,289 | 2/1999 | Gerstel et al. | 359/110 |
| 5,903,370 | 5/1999 | Johnson | 359/119 |
| 5,903,371 | 5/1999 | Arecco et al. | 359/119 |

FOREIGN PATENT DOCUMENTS

| | | |
|---|---|---|
| 2-104148 | 4/1990 | Japan . |
| 2-224538 | 9/1990 | Japan . |
| 7-184238 | 7/1995 | Japan . |
| 8-46570 | 2/1996 | Japan . |
| 8-149088 | 6/1996 | Japan . |

OTHER PUBLICATIONS

Partial English translation of Japanese Office Action dated Sep. 14, 1999.
Proceedings of the 1994 IEICE Fall Conference, Sep. 26–29, 1994, *Er–doped Fiber Amplifier for WDM Networks Using Automatic Gain Control*.

*Primary Examiner*—Kinfe-Michael Negash
*Attorney, Agent, or Firm*—Sughrue, Mion, Zinn, Macpeak & Seas, PLLC

[57] ABSTRACT

Disclosed is an optical network which has a plurality of optical division and insertion nodes and one or a plurality of hub (central) nodes which are circularly connected by using an optical transfer system where a clockwise or counterclockwise data transfer is conducted by using a plurality of optical fibers or an optical wavelength-multiplexing technique; wherein the hub (central) node and the plurality of division and insertion nodes individually use signal lights with wavelengths different from each other and are provided with a transmission system composed of two or more clockwise or counterclockwise independent paths, and the optical division and insertion node selects one of signals obtained from the two or more paths.

3 Claims, 7 Drawing Sheets

OPTICAL NETWORK, OPTICAL DIVISION AND INSERTION NODE AND RECOVERY SYSTEM FROM NETWORK FAILURE

FIELD OF THE INVENTION

This invention relates to an optical network, and more particularly to, a ring-type optical network, and relates to a recovery system from a network failure.

BACKGROUND OF THE INVENTION

Figure 1A:
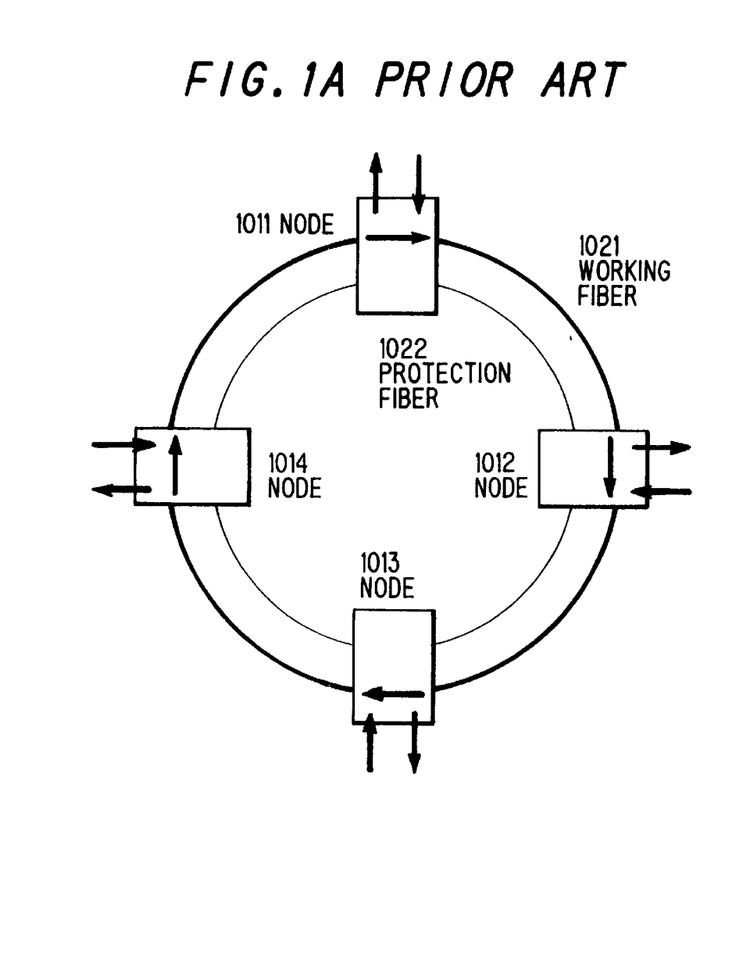
FIGS. 1A and 1B are illustrations showing a conventional failure-recovery system.
Figure 1B:
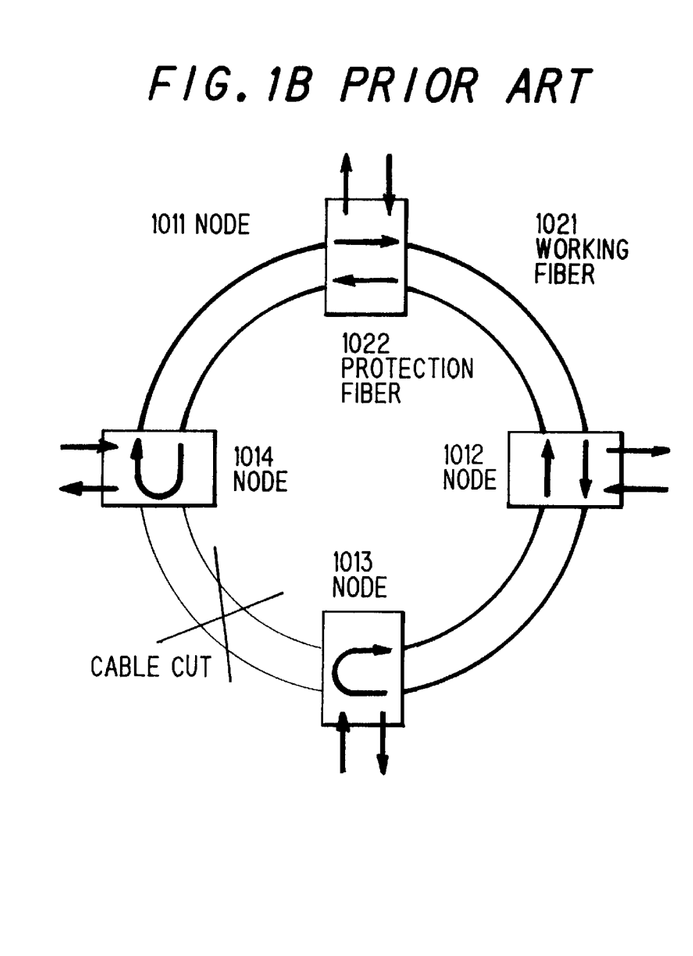

In conventional ring-type optical networks, loop-back techniques havebeen employed to recover from a fiber or node failure. The principle of the loop-back techniques is illustrated in FIGS. 1A and 1B. In this example, nodes 1011 to 1014 are connected through two fibers. One of the two fibers is a working fiber 1021 and the other is a protection fiber 1022. In normal state, signal light exists only on the working fiber 1021, and no signal light exists on the protection fiber 1022. Each of the nodes takes out a signal necessary to its node and outputs a signal addressed to the other node. In case of a failure, e.g., when the fiber is cut at a position marked with "x" in FIG. 1B, signals are transmitted through the protection fiber by switching at both its end nodes. Namely, a crescent-shaped loop is formed as shown in FIG. 1B.

Figure 2:
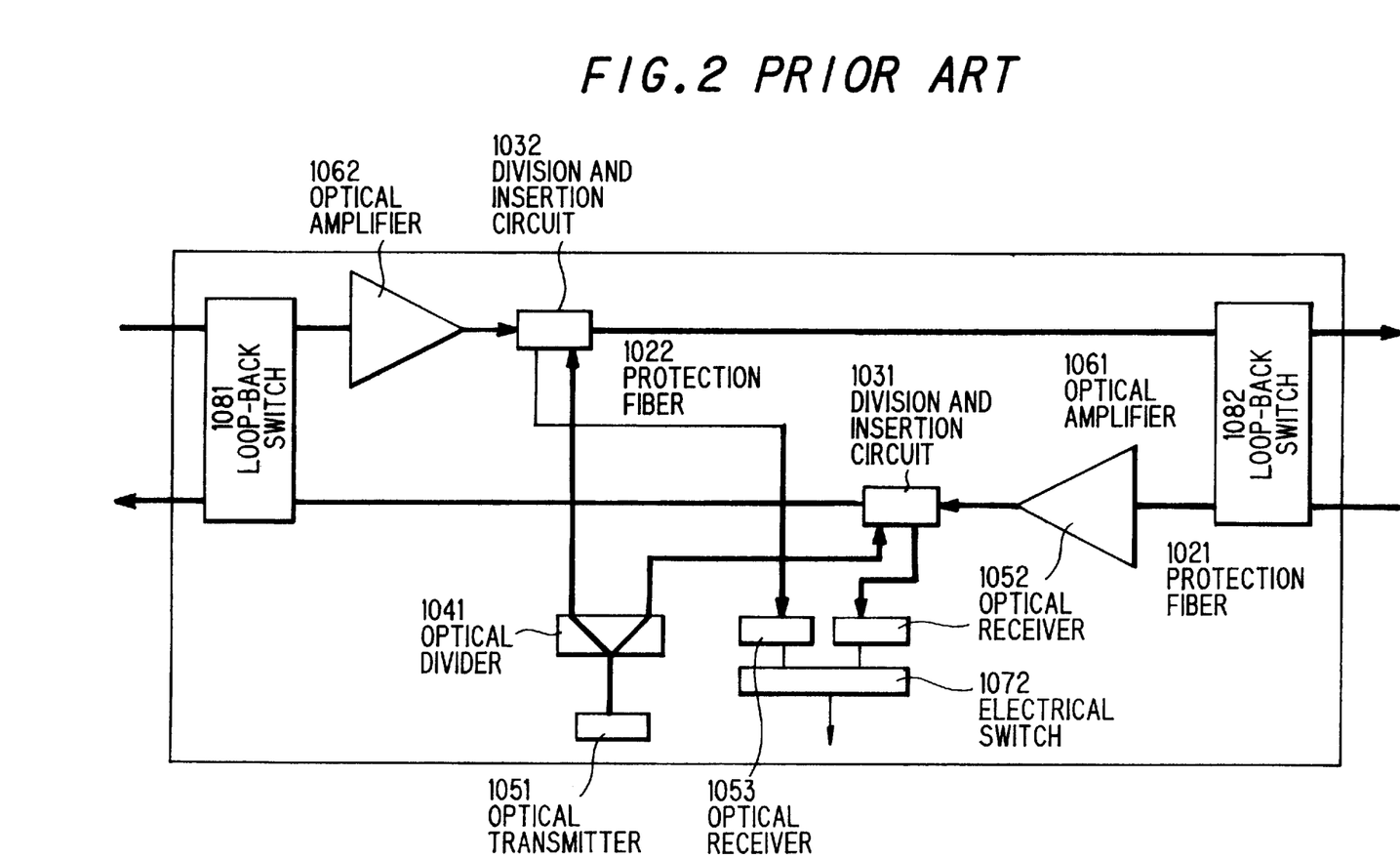
FIG. 2 is a block diagram showing a conventional optical division and insertion node.
Figure 3:
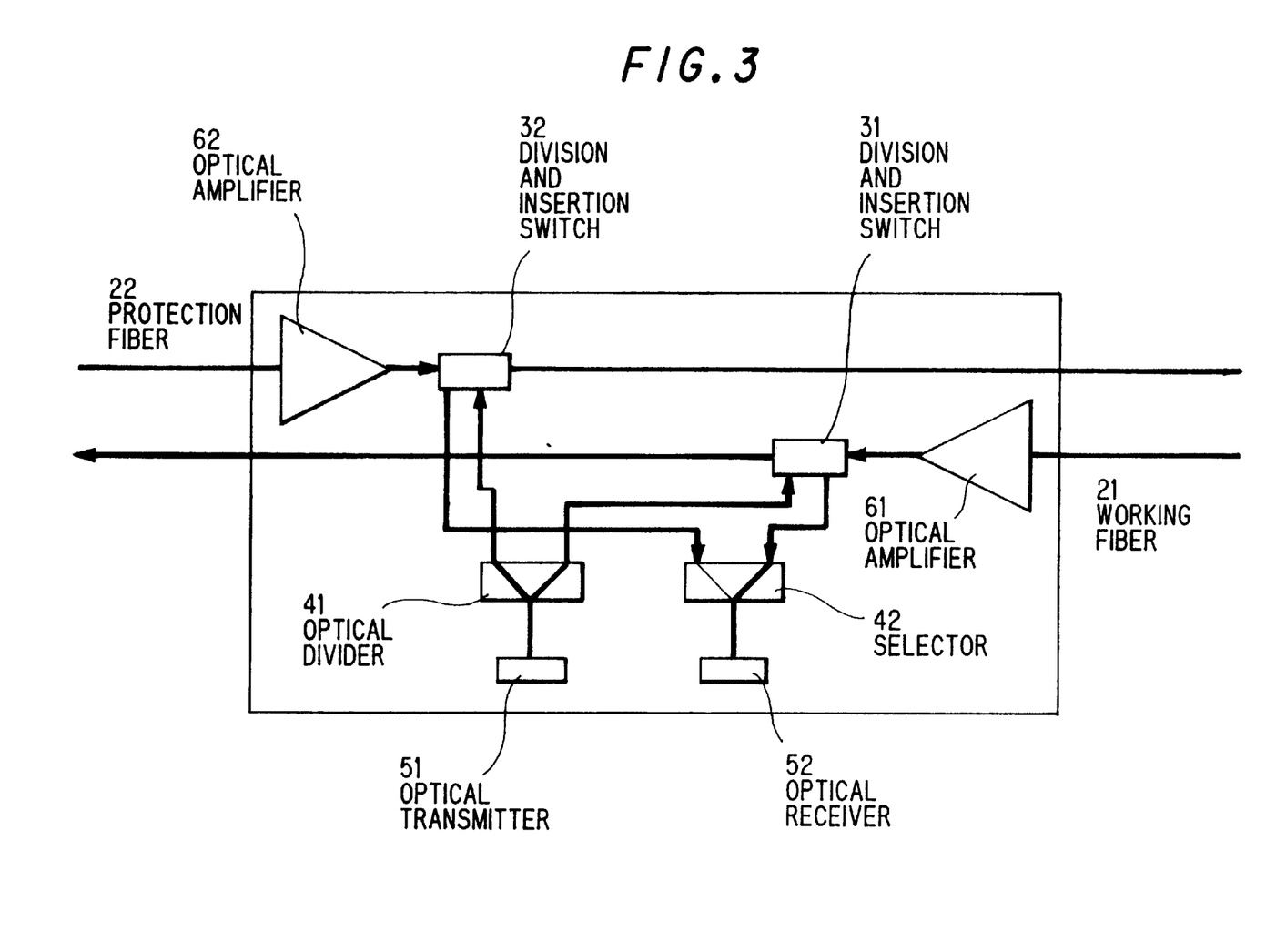
FIG. 3 is a block diagram showing an optical division and insertion node according to the invention.

Another failure-recovery technique for ring-type optical networks has been, as shown in FIG. 2, suggested in Toba et al., "Demonstration of Optical FDM Based Self-Healing Ring Network Employing Arrayed-Waveguide-Grating ADM Filters and EDFAS", The Twentieth European Conference on Optical Communication, Tu.A.2(1994) In this technique, for a main signal, the output of an optical transmitter 1051 is divided by an optical divider 1041 to simultaneously pass a common signal through both a working fiber 1021 and a protection fiber 1022, then one of the signals is selected by using an electrical switch 1072 provided on the side of optical receivers 1052, 1053. Meanwhile, the inputting and outputting of an optical amplifier 1061 are monitored by intensity-modulating light with a wavelength different from that of the main signal. For the optical amplifier monitoring light, the failure recovery is conducted by a loop-back technique using a loop-back switches 1081, 1082.

However, in the conventional loop-back techniques, there are several problems that: the switching takes a long time since the path needs to be switched after identifying a failure position; the wavelength dependency of the gain of an optical amplifier, such as an Er-doped optical fiber amplifier (EDFA) and a semiconductor optical amplifier is varied since the transmission distance of optical signal is greatly changed; signal deterioration is accelerated due to the accumulation of spontaneous emission optical noise caused by a non-linear effect in fiber or an increase in the number of amplifier stages resulting from the increase in the transmission distance of optical signal; signal deterioration is accelerated due to the accumulation of cross talk caused by an increase of the number of switch stages; the device becomes larger and more expensive since a loop-back switch needs to be provided in the node; and the switching from protection fiber to working fiber is necessary after the failure recovery.

In the technique of Toba et al., the above problems in the loop-back technique are solved as to only main signals. However, in actual failure recovery, failure recovery as to only main signals makes no sense. Namely, the failure recovery of the optical amplifier monitoring light needs to be conducted simultaneously. Because of the loop-back operation conducted for the optical amplifier monitoring light, the time required for the failure recovery must be determined by a failure recovery time for optical amplifier monitoring light. Also, a switch for conducting the loop-back operation foroptical amplifier monitoring light is always necessary. Therefore, the device becomes larger and more expensive. Further, BED the switching from protection fiber to working fiber is necessary after the failure recovery. Still further, even when only a specific node detects a failure, the loop-back operation needs to be conducted. Therefore, signal paths in all the nodes will be changed.

SUMMARY OF THE INVENTION

Accordingly, it is an object of the invention to provide an optical network or a recovery system from a network failure where there occurs no signal loss in case of a network failure, signal deterioration due to a change in transmission distance of signal light caused by switching the path for the failure recovery is reduced, a protection fiber can be used even after the failure recovery and unnecessary path-switching can be reduced.

It is a further object of the invention to provide an optical division and insertion node which can serve to recover from a network failure while having a small size and low cost.

According to the invention, an optical network, comprises:

a plurality of optical division and insertion nodes and one or a plurality of hub (central) nodes which are circularly connected by using an optical transfer system where a clockwise or counterclockwise data transfer is conducted by using a plurality of optical fibers or an optical wavelength-multiplexing technique;

wherein the hub (central) node and the plurality of division and insertion nodes individually use signal lights with wavelengths different from each other and are provided with a transmission system composed of two or more clockwise or counterclockwise independent paths, and the optical division and insertion node selects one of signals obtained from the two or more paths.

According to another aspect of the invention, an optical network, comprises:

a plurality of optical division and insertion nodes, each of which comprising an optical transmitter, an optical divider which is connected to an output port of the optical transmitter and divides an output of the optical transmitter into two parts, a first optical amplifier which is connected to a working fiber and is controlled to have a constant gain, a first division and insertion circuit which is connected to an output port of the first optical amplifier and one output port of the optical divider, a second optical amplifier which is connected to a protection fiber and is controlled to have a constant gain, a second division and insertion circuit which is connected to one of an output port of the second optical amplifier and the other output port of the optical divider, an optical selector which is connected to output ports of the first and second optical division and insertion circuits and selects one of outputs of the first and second optical division and insertion circuits, and an optical transmitter which is connected to the optical selector; and a hub (central) node which terminates a transmitted signal from one of the optical division and insertion nodes to give a terminal signal and transfers the terminal signal as it is or after time-separating and switching the connection path to the other of the optical division and insertion nodes;

wherein the hub node has a function to switch connection paths so as to change the network composition.

According to another aspect of the invention, an optical division and insertion node, comprising:

an optical transmitter;

an optical divider which is connected to an output port of the optical transmitter and divides an output of the optical transmitter into two parts;

a first optical amplifier which is connected to a working fiber and is controlled to have a constant gain;

a first division and insertion circuit which is connected to an output port of the first optical amplifier and one output port of the optical divider;

a second optical amplifier which is connected to a protection fiber and is controlled to have a constant gain;

a second division and insertion circuit which is connected to one of an output port of the second optical amplifier and the other output port of the optical divider;

an optical selector which is connected to output ports of the first and second optical division and insertion circuits and selects one of outputs of the first and second optical division and insertion circuits; and an optical transmitter which is connected to the optical selector.

According to another aspect of the invention, a recovery system from a network failure, comprising:

two or more nodes, each of which including an optical transmitter, an optical divider which is connected to an output port of the optical transmitter and divides an output of the optical transmitter into two parts, a first optical amplifier which is connected to a working fiber and is controlled to have a constant gain, a first division and insertion circuit which is connected to an output port of the first optical amplifier and one output port of the optical divider, a second optical amplifier which is connected to a protection fiber and is controlled to have a constant gain, a second division and insertion circuit which is connected to one of an output port of the second optical amplifier and the other output port of the optical divider, an optical selector which is connected to output ports of the first and second optical division and insertion circuits and selects one of outputs of the first and second optical division and insertion circuits, and an optical transmitter which is connected to the optical selector;

wherein a recovery operation from a network failure is conducted by switching the optical selector.

Figure 4A:
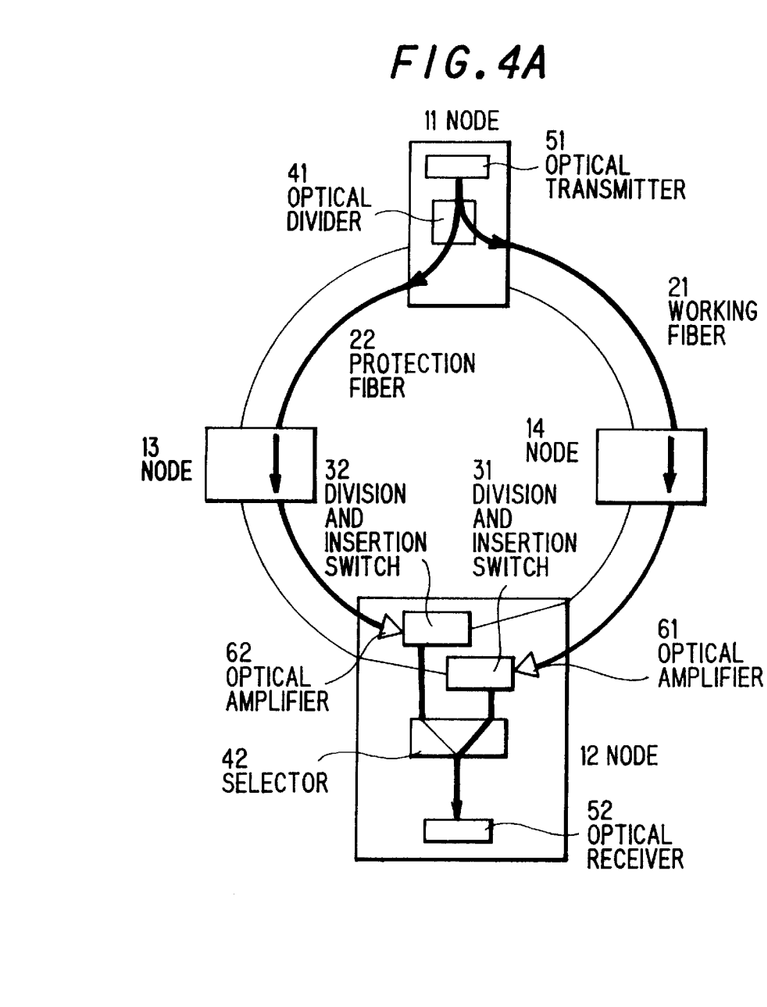
FIGS. 4A and 4B are illustrations showing a failure-recovery system according to the invention.

In the recovery system from a network failure according to the invention, a transmitting node in normal state divides signal light by the optical divider and then sends them equally to the working and protection fibers, as shown in FIG. 4A, like the conventional method(Toba et al.).

The selector of a receiving node in normal state selects the working fiber. When no signal is received by the optical receiver, the selector is switched to select the protection fiber(FIG. 4B).

In optical amplifiers, where the gain is controlled to be constant, light for monitoring the optical amplifier as in the conventional optical network is not necessary. A method for controlling the gain oE an optical amplifier constant has been suggested in, e.g., M. Misono et al., IEICE, Autumn Meeting, B-943(1994). By using this method, light requiring the loop-back operation on failure recovery can be omitted.

Therefore, a quick failure recovery, a reduced change in transmission distance and a miniaturized and cost-reduced device can be obtained.

Figure 4B:
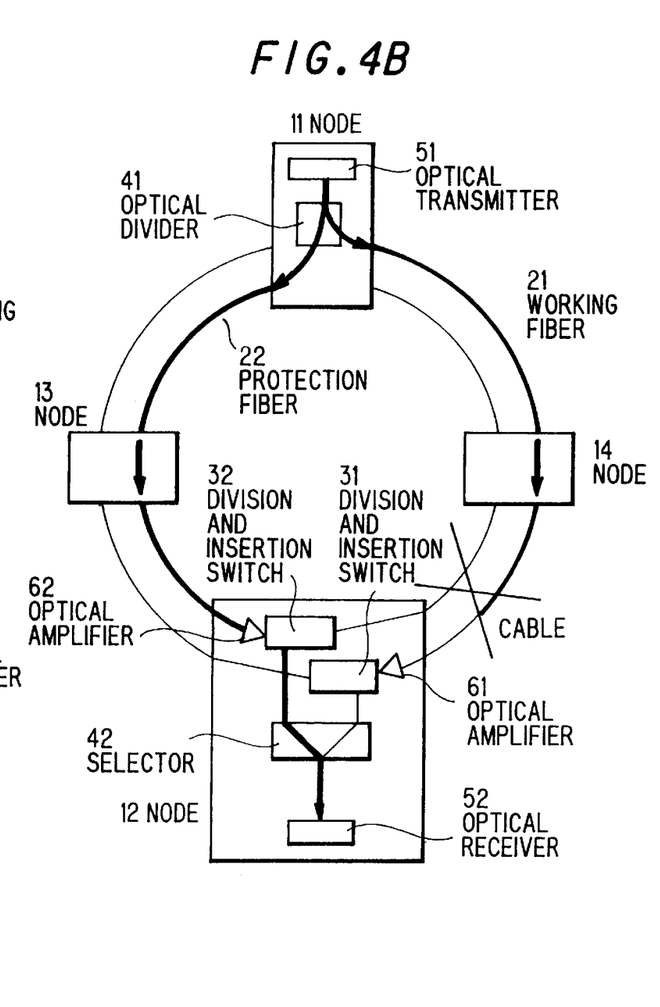

Also, as shown in FIGS.4A and 4B, the working system and protection system are completely symmetrical. Thus, even after the failure recovery, the protection system can be used continuously, thereby reducing unnecessary path-switching.

Furthermore, the basic functions for failure recovery can be obtained by using the simple composition where the optical divider and the selector in the transmitter and receiver, respectively need only to be provided. Therefore, aminiaturized and cost-reduced node can be obtained. Also, fast fiber-switching and hitless failure recovery can be conducted since a failure position does not need to be identified before switching.

Furthermore, the variation in wavelength dependency of the gain of an Er-doped optical fiber amplifier(EDFA) is small since the change in transmission distance of optical signal is relatively small. Also, the accumulation of spontaneous emission optical noise caused by a non-linear effect in fiber or an increase in the number of amplifier stages resulting from the increase in the transmission distance of optical signal, accumulation of cross talk caused by an increase of the number of switch stages etc. can be suppressed.

BRIEF DESCRIPTION OF THE DRAWINGS

The invention will be explained in more detail in conjunction with the appended drawings, wherein.

DESCRIPTION OF THE PREFERRED EMBODIMENTS

Figure 5:
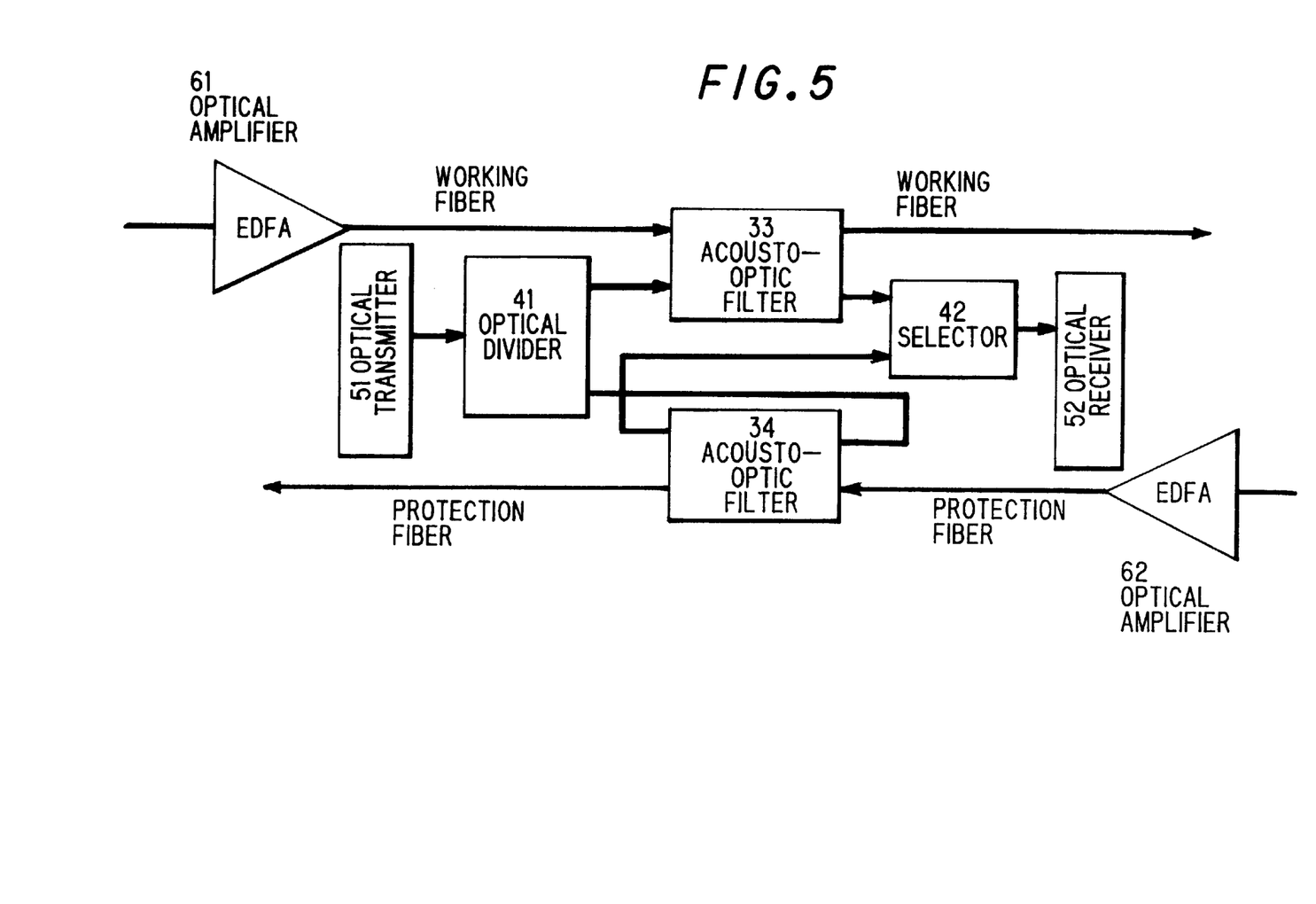
FIG. 5 is a block diagram showing an optical division and insertion node in a preferred embodiment according to the invention.

An optical network, an optical division and insertion node and a recovery system from network failure in the preferred embodiments will be explained below. Here, nodes 11, 12 in FIGS.4A and 4B are 15 optical division and insertion nodes where acousto-optic filters in FIG. 5 are used as division and insertion circuits. The acousto-optic filter functions to separate only light with a frequency to be determined by the frequency of a high-frequency signal to be input from a wavelength-multiplexed optical transmission line and to insert light with a frequency equal to the separated frequency into the optical transmission line.

Meanwhile, D. A. Smith et al., Electronics Letters, Vol. 27, No.23, pp. 2102–2103 (1991) has been detailed as to the principle of acousto-optic filter operation.

Now, referring to FIGS.4A and 4B, signal lights with wavelengths 1552 nm, 1556 nm are on a working fiber 21 and a protection fiber 22, respectively, and a signal from the node 11 to node 12 is transmitted using the light with a wavelength of 1552 nm.

The composition of the node 11 is as shown in FIG. 5. The oscillation wavelength of an optical transmitter 51 is 1552 nm. Signal light power output from the optical transmitter 51 is equally divided into two parts by an optical divider 41, and then they are input to the acousto-optic filters 33, 34. By activating the acousto-optic filters 33, 34 to conduct the division and insertion operations to light with a wavelength of 1552 nm, signal lights from the optical divider 41 are equally output to both the working fiber and the protection fiber.

These signal lights are, as shown in FIG. 4A, input to the node 12 through the working fiber 21 and protection fiber 22. The composition of the node 12 is also as shown in FIG. 5. Optical signals on the working fiber 21 and protection fiber 22 are amplified by optical amplifiers 61, 62, respectively. These optical amplifiers are controlled to keep the gain constant and its controlling and monitoring can be conducted at the node where the optical amplifier is disposed. Therefore, light for monitoring as in the conventional optical network(e.g., Toba et al.) does not need to be flown on the fiber of the node.

In this embodiment, an Er-doped optical fiber amplifier (EDFA) is used. Alternatively, a semiconductor optical amplifier may be used. Also, when the wavelength band of signal light is 1.3 μm, a Pr-doped optical fiber amplifier or a semiconductor optical amplifier may be used.

The outputs of the optical amplifiers 61, 62 are input to the acousto-optic filters 33, 34, respectively. When both the acousto-optic filters 33 and 34 are activated to conduct the division and insertion operations to light with a wavelength of 1552 nm, signal light with a wavelength of 1552 nm sent from the node 11 is separated. The separated signal lights for working and protection are input to a selector 42. The selector 42 usually selects the working signal light. The output of the selector 42 is input to an optical receiver 52 to perform the reception.

Next, the case that a failure on the working fiber 21 occurs will be explained. When the selector 42 of the node 12 selects the working signal light, the occurrence of the failure can be detected by a decrease in optical power supplied to the optical amplifier 52. The detection of a failure may be performed by separating a part of output light of the selector 42 and monitoring its optical power.

When the failure is detected at the node 12, the selector 42 of the node 12 needs only to be switched to the side of the protection fiber. In contrast to the conventional optical networks, this allows all the failure recovery to be completed. Namely, as explained above, signals common to the working fiber and the protection fiber are always flown on the two fibers. Therefore, when the selector 42 is switched, the reception can be restarted.

However, the transmission distances from the node 11 to the node 12 in the working system and protection system are generally different from each other. Therefore, this difference needs to be compensated. An effective method for compensating the difference has been suggested in, e.g., T. Shiragaki et al., 19th European Conference on Optical Communication, TuP 5.3(1993), where photonic hitless switching is used. Such a hitless optical switch can be used as the selector 42 to perform the failure recovery without making a loss when a failure occurs.

Figure 6:
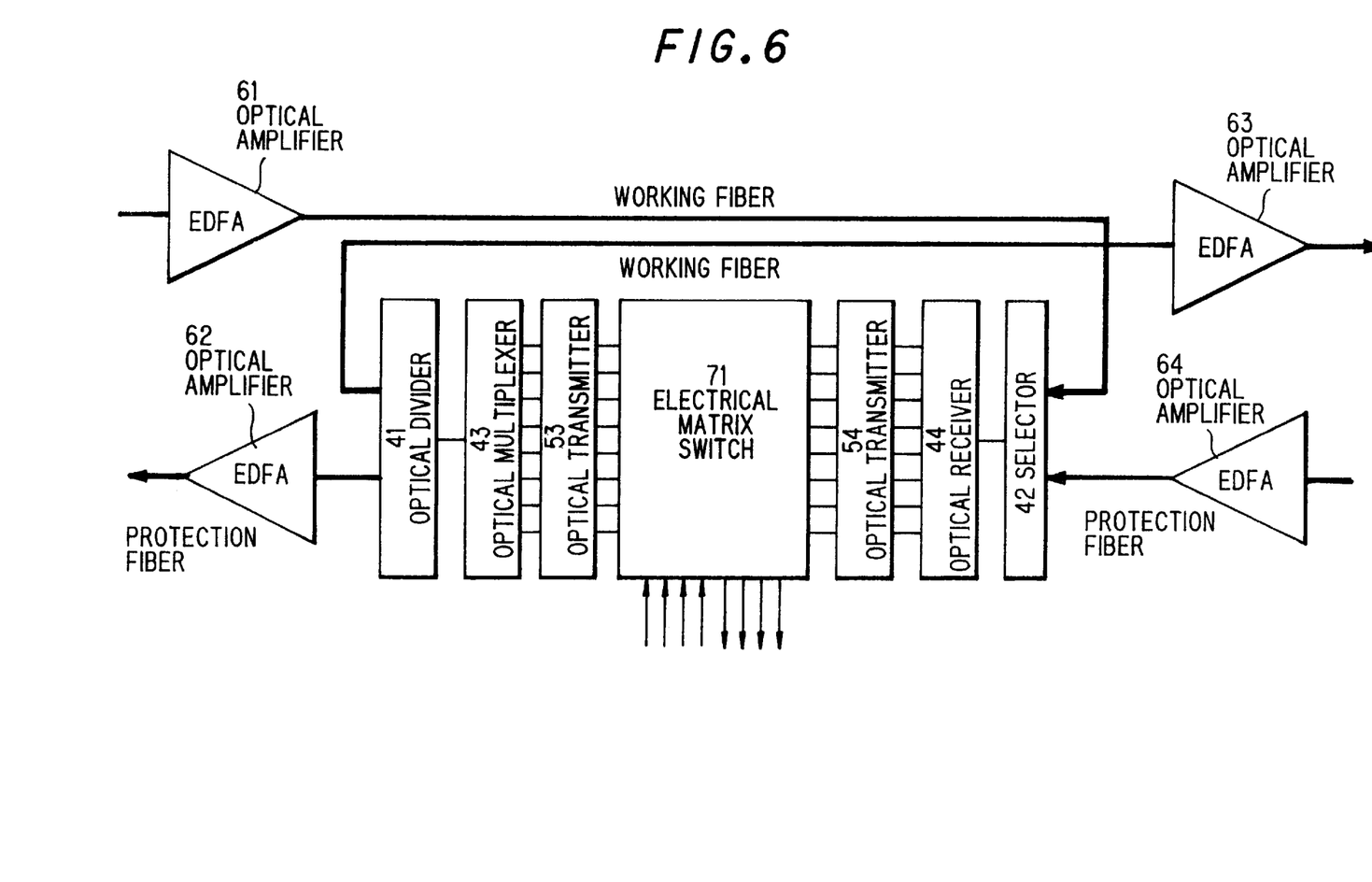
FIG. 6 is a block diagram showing an optical division and insertion node in another preferred embodiment according to the invention.

The division and insertion node may be composed as shown in FIG. 6, other than composed of the acousto-optic filer as explained earlier. In the composition in FIG. 6, one of the working and protection inputs is selected, thereafter output to different optical transmission lines for respective wavelengths by using an optical demultiplexer 44. An optical receiver 54 is composed of photodiodes whose number is equal to that of the optical transmission lines, e.g., 8 photodiodes in this example, and it converts the respective optical signals into electrical signals. Then, by an electrical matrix switch 71, the signal division, insertion or signal switching between the respective wavelengths is conducted. The outputs from here are converted into optical signals by an optical transmitter 53 which is composed of lasers with oscillation wavelengths different from each other, then wavelength-multiplexed the optical signals with different wavelengths into one fiber by using an optical multiplexer 43. The optical power of the optical multiplexer 43 is equally divided into two parts, and they are output to the working fiber and protection fiber.

Also in this composition, the optical amplifiers 61 to 64 are controlled to keep the gain constant and its controlling and monitoring can be conducted at the node where the optical amplifier is disposed. Alternatively, without receiving all the outputs of the optical demultiplexer 44, only the signals on transmission lines where wavelengths to be separated exist may be connected with the optical receiver 54 while inputting the other signals directly into the optical multiplexer 43. Also, the optical transmitter 53 may be composed of only lasers oscillating at wavelengths to be inserted and the outputs may be input to the optical multiplexer 43.

A method for controlling the gain of an optical amplifier constant has been suggested in, e.g., M. Misono et al., IEICE, Autumn Meeting, B-943(1994). Other than this method, all methods for automatically controlling the gain of an optical amplifier constant, such as a method where respective parts of input light and output light of an optical amplifier are separated, the light powers are compared and the ratio is controlled to be constant, can be incorporated into this invention.

Also, the optical amplifier may be placed at all positions, such as the output port of a node, other than the input port of a node shown in FIG. 5. Further, a plurality of optical amplifiers may be, as shown in FIG. 6, disposed on the working system and protection system, respectively.

Figure 7:
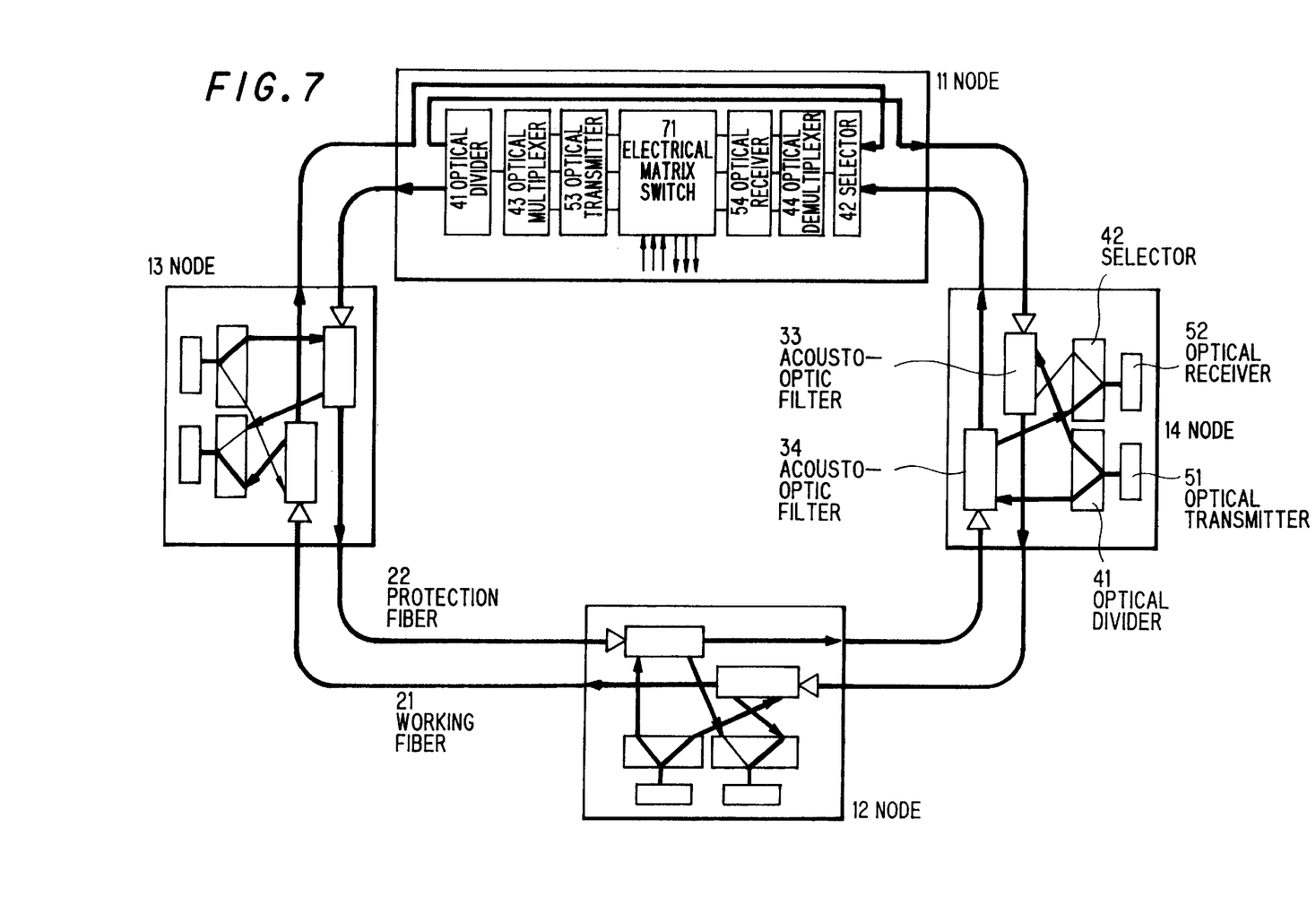
FIG. 7 is a block diagram showing an optical network in a preferred embodiment according to the invention.

An example of an optical network using optical division and insertion nodes according to the invention will be explained in FIG. 7. Node 11 is implemented according to the embodiment as shown in FIG. 6 and nodes 12 to 14 are implemented according to the embodiment as shown in FIG. 5. The optical transmitter 53 in the node 11 is provided with lasers with wavelengths of 1548 nm, 1552 nm and 1556 nm. Light with a wavelength of 1548 nm carries only a signal addressed to the node 12, light with a wavelength of 1552 nm carries only a signal addressed to the node 13 and light with a wavelength of 1556 nm carries only a signal addressed to the node 14. Both the acousto-optic filters 33 and 34 for the working and protection systems, respectively in the node 14 select 1556 nm light. The oscillation wavelength of the optical transmitter 51 in the node 14 is 1556 nm. After equally dividing the optical power into two parts by the optical divider 41, they are inserted through the acousto-optic filters 33, 34 into the working fiber 21 and protection fiber 22. In similar manners, the node 12 is operated at a wavelength of 1548 nm and the node 13 is operated at a wavelength of 1552 nm.

By applying a recovery system from network failure according to the invention to this network, nodes except a node where a failure is detected can continue the normal operation without conducting the failure-recovery operation. For example, In FIG. 7, taken is the case that a failure is detected at the node 14 and no failure is detected at the nodes 11 to 13. In this case, the failure-recovery operation can be completed by only switching the selector 42 of the node 14 in the direction of the protection fiber 22. The same manner can be also applied to the case that a failure is detected at the other node.

The wavelength of the laser may be wavelengths included in 1.5 μm band, 1.3 μm band or the like, other than the wavelengths used in the above example.

Meanwhile, in this example, three nodes according to the embodiment in FIG. 5 and one node according to the embodiment in FIG. 6 are employed. However, the number of nodes is not limited to these, i.e., it is optional. For example, sixteen nodes according to the embodiment in FIG. 5 and two nodes according to the embodiment in FIG. 6 may be employed.

Although the invention has been described with respect to specific embodiments for complete and clear disclosure, the appended claims are not to be thus limited but are to be construed as embodying all modification and alternative constructions that may be occurred to one skilled in the art which fairly fall within the basic teaching set forth here.

What is claimed is:

1. An optical network, comprising:
   a working fiber;
   a protection fiber;
   a plurality of optical division and insertion nodes, each of said plurality of optical division and insertion nodes comprising:
      an optical transmitter;
      an optical divider which is connected to an output port of said optical transmitter, said optical divider dividing an output of said optical transmitter into two parts to provide outputs at first and second output ports,
      a first optical amplifier which is connected to the working fiber and is controlled to have a constant gain;
      a first division and insertion circuit which is connected to an output port of said first optical amplifier and the first output port of said optical divider;
      a second optical amplifier which is connected to the protection fiber and is controlled to have a constant gain;
      a second division and insertion circuit which is connected to an output port of said second optical amplifier and the the second output port of said optical divider;
      an optical selector which is connected to output ports of said first and second optical division and insertion circuits and selects an output from said first and second optical division and insertion circuits; and
      an optical receiver which is connected to said optical selector to receive the selected output of said first and second optical division and insert circuits; said network further comprising:
         a hub node which terminates a transmitted signal from one of said optical division and insertion nodes to give a terminal signal and transfers said terminal signal to one of said plurality of optical division and insertion nodes;
         wherein said hub node is operable to switch connection paths so as to change the network composition.

2. An optical division and insertion node, comprising:
   an optical transmitter;
   an optical divider which is connected to an output port of said optical transmitter and divides an output of said optical transmitter into two parts to provide outputs at first and second output ports;
   a first optical amplifier which is connected to a working fiber and is controlled to have a constant gain;
   a first division and insertion circuit which is connected to an output port of said first optical amplifier and the first port of said optical divider;
   a second optical amplifier which is connected to a protection fiber and is controlled to have a constant gain;
   a second division and insertion circuit which is connected to an output port of said second optical amplifier and the second output port of said optical divider;
   an optical selector which is connected to output ports of said first and second optical division and insertion circuits and selects an output from said first and second optical division and insertion circuits; and
   an optical receiver which is connected to said optical selector to receive the selected output of said first and second optical division and insertion circuits.

3. A recovery system from a network failure, comprising:
   two or more nodes, each of said nodes including:
      an optical transmitter;
      an optical divider which is connected to an output port of said optical transmitter and divides an output of said optical transmitter into two parts to provide outputs at first and second output ports;
      a first optical amplifier which is connected to a working fiber and is controlled to have a constant gain;
      a first division and insertion circuit which is connected to an output port of said first optical amplifier and the first output port of said optical divider;
      a second optical amplifier which is connected to a protection fiber and is controlled to have a constant gain, a second division and insertion circuit which is connected to an output port of said second optical amplifier and the second output port of said optical divider;
      an optical selector which is connected to output ports of said first and second optical division and insertion circuits and selects an output from said first and second optical division and insertion circuits;
      and an optical receiver which is connected to said optical selector to receive the selected output of said first and second optical division and insertion circuits;
   wherein a recovery operation from a network failure is conducted by switching said optical selector.

* * * * *

UNITED STATES PATENT AND TRADEMARK OFFICE
CERTIFICATE OF CORRECTION

PATENT NO. : 6,137,603
DATED : October 24, 2000
INVENTOR(S) : Naoya Henmi

It is certified that error appears in the above-identified patent and that said Letters Patent is hereby corrected as shown below:

Column 1, line 3, delete "havebeen" insert --have been--.

Column 2, lines 4-5, delete "foroptical" insert --for optical--;

line 7, delete "BED"

Column 3, line 64, delete "oE" insert --of--.

Column 4, line 13, delete "aminiaturized" insert --a miniaturized--;

line 55, delete "15".

Signed and Sealed this

First Day of May, 2001

Attest:

NICHOLAS P. GODICI

Attesting Officer     Acting Director of the United States Patent and Trademark Office